April 7, 1953  O. K. KELLEY  2,633,760
COMPOUND GEAR DRIVE
Filed March 31, 1945  5 Sheets-Sheet 1
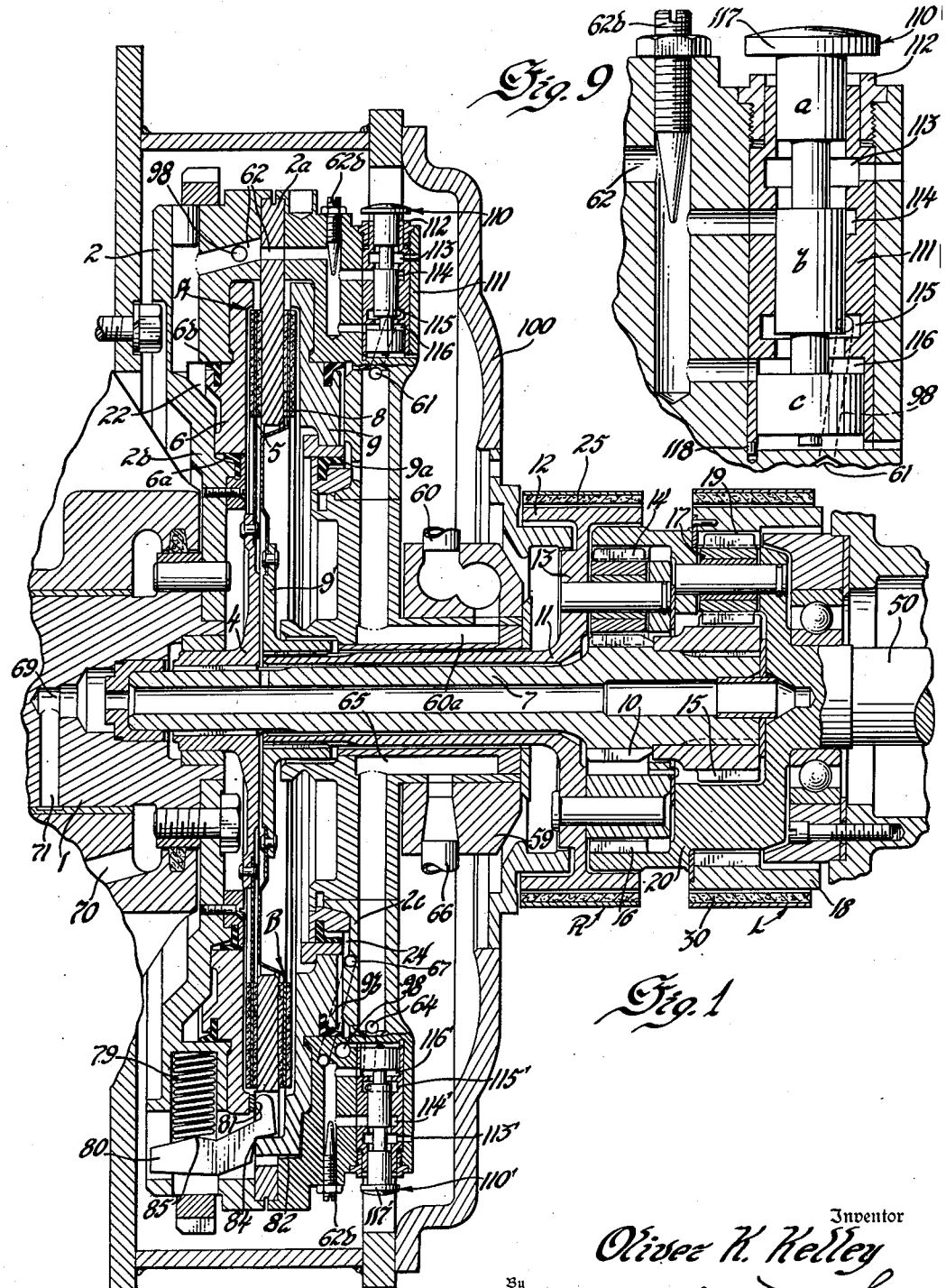
Inventor
Oliver K. Kelley
By
Chadwick, Spencer & Flint
Attorneys

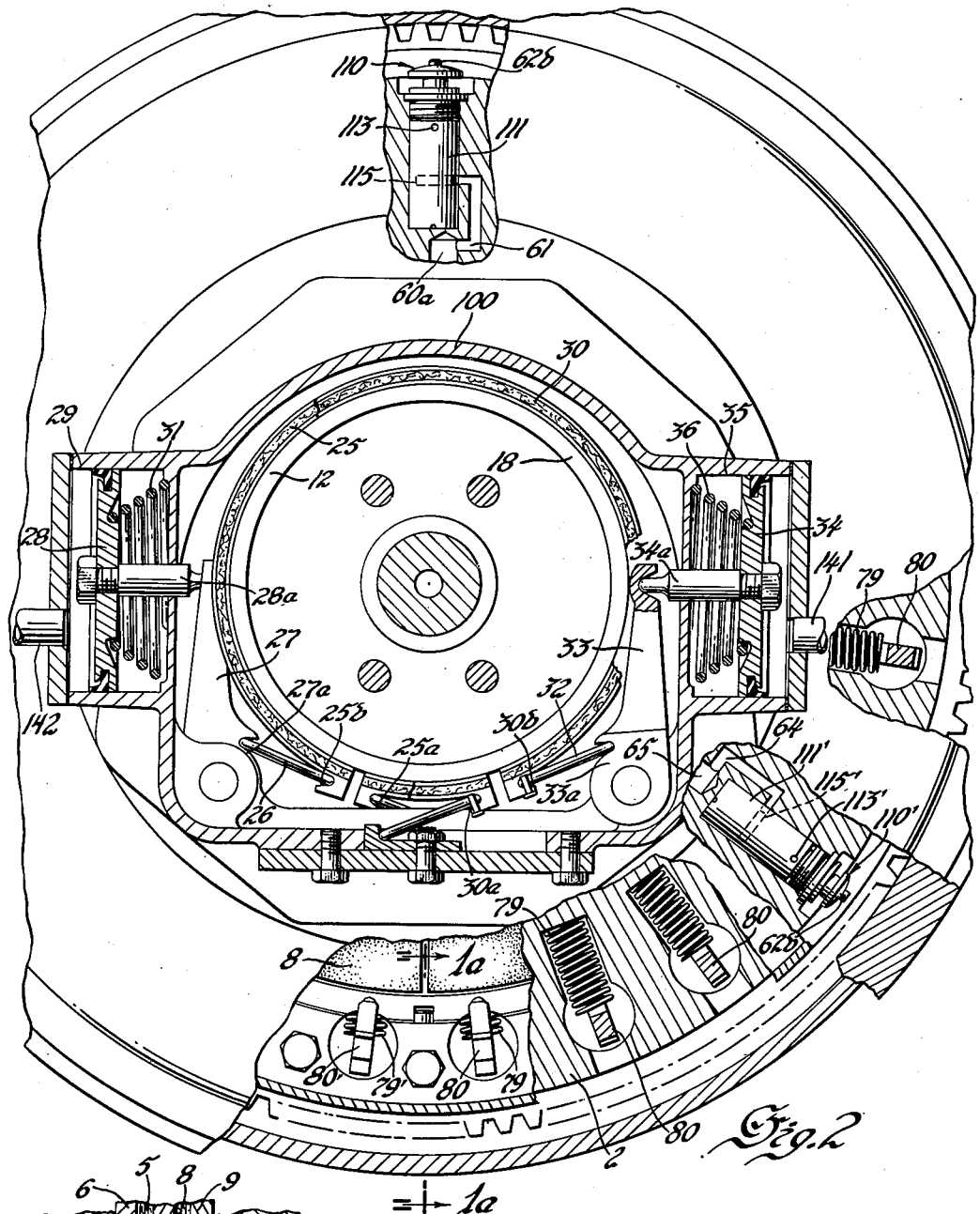
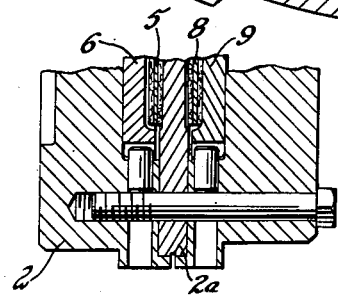

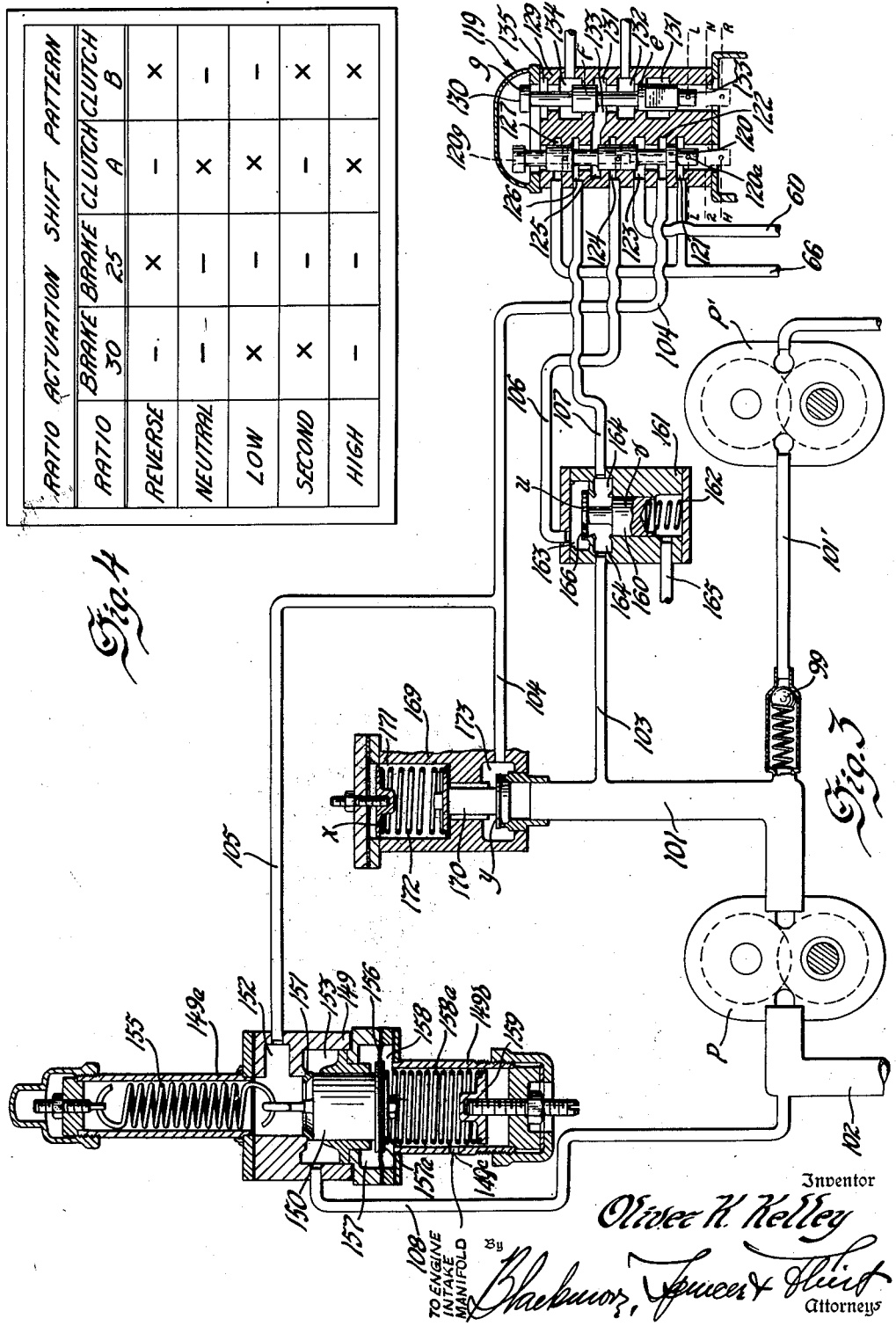

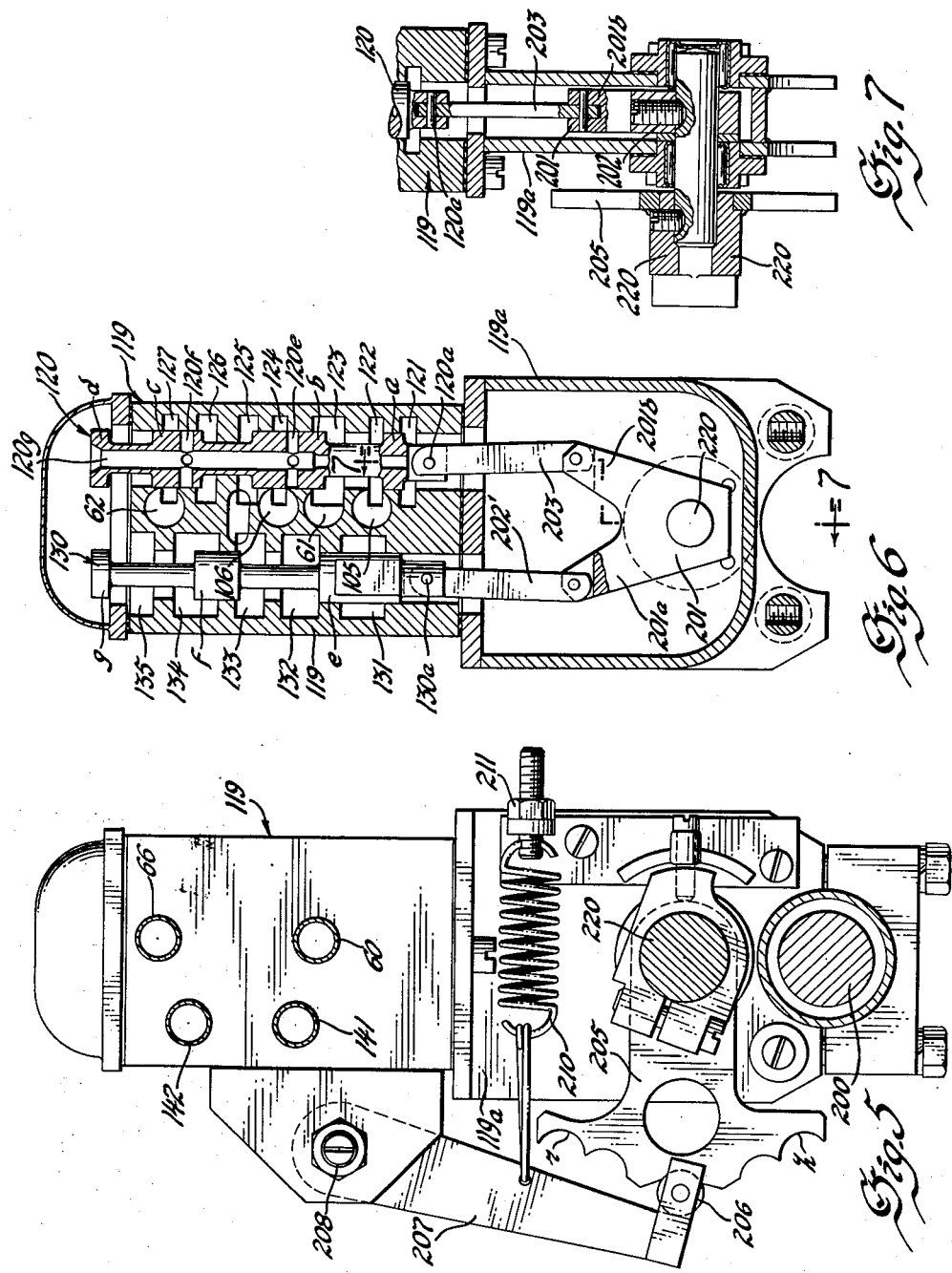

April 7, 1953     O. K. KELLEY     2,633,760
COMPOUND GEAR DRIVE

Filed March 31, 1945     5 Sheets-Sheet 5

Inventor
Oliver K. Kelley
By Blackmore, Spencer & Flint
Attorneys

Patented Apr. 7, 1953

2,633,760

UNITED STATES PATENT OFFICE 2,633,760

COMPOUND GEAR DRIVE

Oliver K. Kelley, Birmingham, Mich., assignor to General Motors Corporation, Detroit, Mich., a corporation of Delaware Application March 31, 1945, Serial No. 585,827

32 Claims. (Cl. 74—752)

The invention relates to improvements in self-propelled motor vehicles of step-ratio transmissions, to arrangement of drive elements thereof for compact assembly, to particular combinations of compound gearing and multiple input clutches for obtaining a maximum useful range of drive ratios, to power-actuation for the said clutches and for reaction holding elements thereof, and to control means for providing a pattern of locking and releasing of said elements and of engaging and releasing said clutches. In particular, it relates to these features as applied to multiple unit planetary transmissions as will be understood further.

An object of the invention is to simplify the arrangement of the drive and drive-sustaining transmission elements aforesaid, so that the actuation and control means required may be of minimum complexity; thus affording manual and automatic controls and sub-joined interlocks of positive, yet simple nature for the needs of the modern automotive vehicle.

Another object is to provide an arrangement of reaction elements and clutches such that all forward drive ratio changes in the aforesaid multiple planetary transmissions are made by selective actuation of one or another clutch or by dual actuation of two clutches.

Another object is to provide means to engage and release the said clutches in the aforesaid actuation pattern, energized by fluid pressure servo means which also energizes locking means for the said reaction elements, automatically and manually controlled by valving, and fed from supply means effecting actuation whenever either the engine or the load shaft is rotated.

A further object is to provide shift interval control means subject to speed response, to generated pressure, to rate of change of generated pressure and to variation in the power demand applied to a control pressure system such that the rate of shift of speed ratio proceeds in accordance with speed and power demand.

An additional object is to provide in the said control system combination means to obtain a towing start of a stalled engine at advantageous ratios which lessen the overall strain on the driving mechanism.

A further object is to provide a compound dual planetary gear transmission which produces low speed drive by the application of input torque to a transmission shaft carrying sun gears of each of two planetary units; which produces 2nd speed reduction drive by the transfer of input torque to an otherwise idling reaction member under forward rotation during low forward drive, while one reaction element of one of said units is held against rotation for both low and 2nd speed ratio reduction drive.

It is also an object of the invention to provide in the aforesaid combinations the further facility of applying the input torque simultaneously to one of the said sun gears and to the said idling reaction member for one-to-one ratio drive, while the means which had been locking the forward drive reaction element for both low and 2nd speed reduction ratios is de-energized and self-released for accelerating forward to one-to-one ratio.

The present invention specifically relates to particular combinations of gearing of planetary types with plural clutches for establishing a drive-element pattern which is adaptable to operation by simple actuation and control means, and which provides three forward speed ratios and a reverse speed ratio in a very small volumetric space.

In using planetary gearing for this purpose, I find it possible to utilize selected torque paths which for all forward speeds are changeable by merely shifting the engagement of clutches as against reaction brakes commonly used in planetary gears for establishing reduction gear drive and for changing same.

The particular gearing and plural clutch combination herein disclosed is believed novel and of unusual utility in this field. It is appreciated that plural clutch transmissions are well known, and likewise plural clutches which are selectively engaged for ratio changes are shown in prior art, among which are shown planetary gears; however, the particular combinations disclosed in the present demonstration do not appear in the prior art, the appended claims defining the points of novelty in the present arrangement over the prior art. This disclosure embodies the use of a double planetary gear consisting of two adjacent units having their sun gears constantly joined, having the carrier of one primary unit constantly connected to the load and to the annulus of the other unit, and arranged so that the reaction annulus of this primary unit is held from rotation for all reduction forward speed drive, while the carrier for the other unit whose annulus is joined to the output carrier, is used as a reverse reaction element or as a second speed input element. The shaft of the two sun gears is equipped with a clutch for providing low gear drive when the first above named reaction element is held, and the secondary unit reaction carrier has a hollow shaft surrounding the first-named clutch and sun gear shaft, the hollow shaft carrying a second clutch for providing compound ratio drive for second speed ratio when the first clutch is disengaged, the first-named reaction element being held stationary. For direct drive both clutches are engaged and the aforesaid primary reaction element is released.

For reverse, the aforesaid secondary unit carrier is locked against rotation and the first named sun gear clutch engaged.

With this gear compounding arrangement, the relative diameters of the gears may be so taken to assure the desired scale of reduction ratios needed to accommodate the engine power curve and the load of a particular vehicle. As shown in the demonstration herein, the unit which provides reverse reduction drive has a sun gear somewhat smaller than the forward low sun gear. Since in 2nd speed reduction a dividing and recombining of torque occurs with the hollow shaft carrier as the sole input member, the desired 2nd speed ratio will be factored by the respective ratios of the two units, in accordance with the particular design requirements.

The demonstration herein also shows a gear pattern in which the dual planetary units may be identical in diametral dimension. This version may be utilized for quantity production of low cost transmissions, it being less expensive to make use of identical parts, by common machining and finishing by a single line of processing. This version is practicable for drives in which the power-load relationship matches the available gear ratios, in conjunction with a properly-selected output drive reduction ratio, as in the differential axle gearing.

Further improvements appear in the nesting arrangement of the clutches adjacent the engine; in forming the engine flywheel member into a clutch housing having individual clutch engagers, oppositely disposed to a central web; the use of engagers consisting of annular pistons actuable by fluid pressure fed through appropriate passages in the clutch housing, and the arrangements of glands and feed lines connected to a pumping system utilized also to energize brakes for the forward and reverse reduction reaction drums for the planetary annulus gear and carrier noted above.

A pumping system is provided, driven by the input shaft, augmented by pressure supplied by a tail shaft pump.

The various improvements and novelties of these and additional features will appear in the following specification where their utilities are set forth in an operative sequence.

The Letters Patent to F. F. Small and C. E. Nagel, U. S. 1,609,782 is of the general type of the disclosure herein. In this patent there are two input clutches and two reaction elements in the gear unit, which however, is a single compound unit with the carrier connected to the load. Whereas in this patent, the reactions are taken on a sun gear and annulus gear respectively, with low ratio clutch input to a single sun gear, my invention herewith applies the low ratio clutch input to the two sun gears, and takes reaction on an annulus of one unit and the carrier of the other unit. The patented device to Small and Nagel operates such that to make the transition from low to 2nd, it is necessary to change not only the engagement of the clutches, but also to shift reaction from one brake to the other, while in the present invention this transition is made by merely changing engagement of the clutches without changing the reaction elements. It will be understood that with my invention this shift occurs when the relative speed between the idling 2nd speed driven clutch and the engine will be a normally diminishing differential so that the shift may occur rapidly while the differential torque is absorbed in the clutch system, whereas in the noted patent the 2nd speed reaction member must be brought down to zero speed while the low gear reaction member which would endeavor to rotate reversely is compelled to run forwardly by the engagement of the 2nd speed clutch. The patent uses the same low gear reaction element for its 2nd speed drive couple, whereas the invention herein uses the separate reverse reaction element for the 2nd speed drive couple, hence avoids the complications of staging the brake and clutch actuator controls inherent in this patent, and provides a more useful device from the standpoint of simplicity.

The above noted patent is referred to in order to set forth clearly the features of novelty herein, as against the prior art.

Fig. 1 is a vertical longitudinal section of a transmission assembly built in accordance with the invention herein. Fig. 1a is a section taken at a flywheel bolt on the line 1a—1a of Figure 2 to show a detail of the clutch compartment assembly.

Fig. 2 is a view of the assembly of Fig. 1 broken away from part sections to show the various drive and control elements as they are related in the example herewith.

Fig. 3 is a diagram of the servo pressure and control system for the Figs. 1 and 2 construction.

Fig. 4 is a table of the shift actuation pattern for the transmission brakes and clutches in accordance wtih the Fig. 3 diagram.

Figure 8:
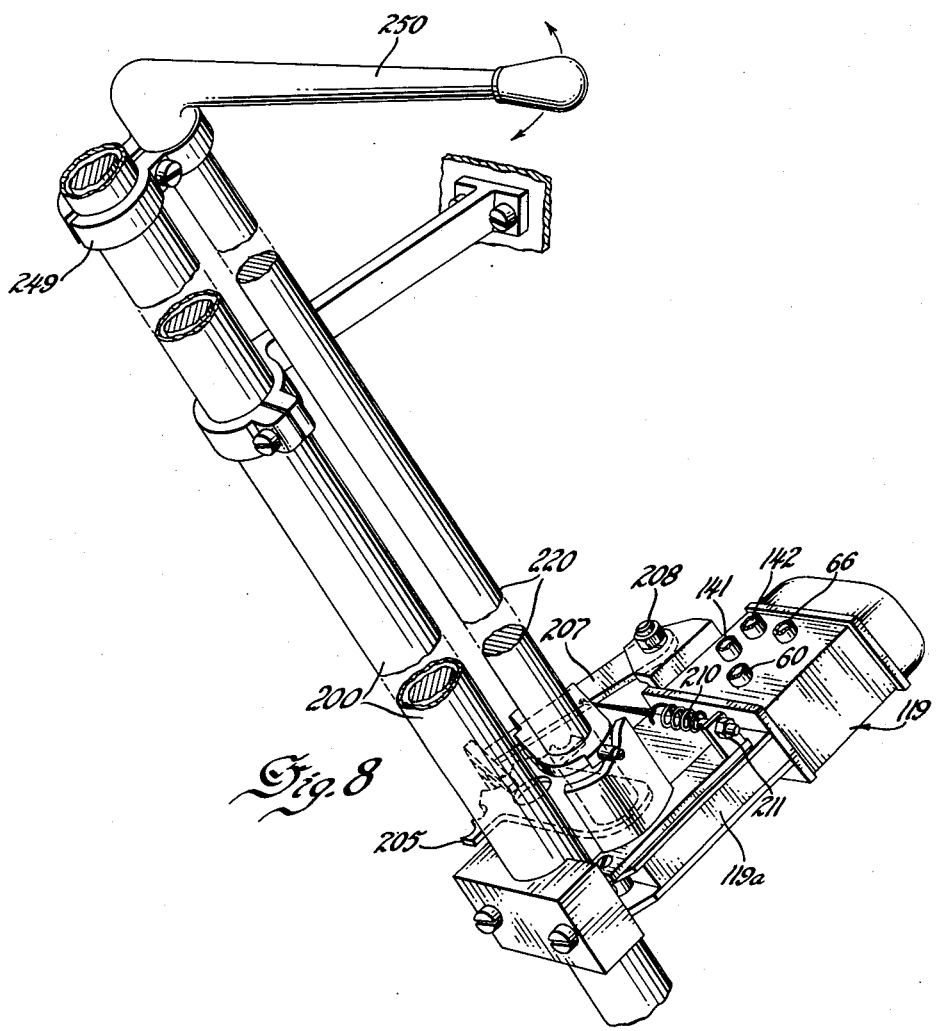

Figs. 5, 6 and 7 are views of the external and internal parts arrangement for the control mechanism of the manual valving of Fig. 3. The linkage of levers to the valving is shown in a sectioned portion of Fig. 6 in a plane below that of the view of Fig. 5, and the mechanism of Fig. 7 is shown as sectioned on line 7—7 of Fig. 6. Fig. 8 is a perspective view of the mechanism of Figs. 5, 6 and 7 as installed in a vehicle.

Fig. 9 is a sectional view of one of the centrifugal valve regulators of Figs. 1 and 2 utilized to control the rate of loading of the clutches in accordance with speed of the engine.

The vertical section of Fig. 1 shows the general arrangement of a transmission built in accordance with the invention. The engine is located at the left, and its shaft 1 is fastened to or is integral with a flywheel drum 2 adjacent two transmission clutches A and B. The planetary gear unit adjacent the drum and clutches is termed herein the front unit, while the one at the right is called the rear unit. The driven or load shaft 50 projects at the right, and is driven by elements of both units.

The drum 2 is recessed to house the clutch operating mechanism for engaging one or both of the clutuches A, B with the drum 2.

Means are provided to actuate the brake bands 25 and 30 for the reaction members for reverse and forward reduction drive respectively.

Means are also provided to vary the engine power, and a means responding to the power being generated is connected to operate controls which determine the automatic variation of torque capacity under shifting of ratio by the clutches A, B and brake 30. Brake 25 is only used for reverse ratio. Ratio selection means are manually selected for all speed ratios.

The hub 4 of clutch 5 is attached to transmission shaft 7 to which are affixed an integral sun gear 10 of the reversing unit R, and sun gear 15 of the low speed unit L. The hub 9' of clutch B is attached to hollow shaft 11 integral with carrier 13 for planet gears 14 meshing with sun gear 10 and annulus 16. The drum 12 of carrier 13 is capable of providing drive reaction when brake 25 is applied to it. Plate 5 is for clutch A and plate 8 for clutch B.

The output shaft 50 is integral with carrier 20 for the rear unit, supporting planet gears 17 meshing with sun gear 15 and annulus gear 19, to which brake 30 may be applied; and is attached to annulus gear 16 of the front unit. The elements 5—4—7—10—15 always rotate together, and the elements 16—20—50 always rotate together at output shaft speed. As will be understood further, this assembly provides a plurality of drive trains. The reaction-supporting elements 12 and 18 and the presser plate 2a with drum 2 may be regarded as elements of the drive-establishing combination.

The paths of fluid pressure connection from the control system of Fig. 3 to the clutch compartment of Fig. 1 consist of feed line 60 connected to passage 60a in the gland passages 59 and 61 in the drum 2 leading radially outward to the recess for valve 110, and thence to passage 62 and cylinder space 22 for piston 6 of Fig. 1; and feed line 66 connected to gland passage 65, thence to passage 64 leading outward to the recess for valve 110' whence it connects by passage 67 to cylinder space 24 for clutch piston 9.

Under conditions where input torque is applied to shaft 7 and the sun gears 10, 15, the common fixed coupling of annulus gear 16 and carrier 20 to the load or output shaft 50 is the means for obtaining the needed compound couples for the various drives, as will be understood further.

For drive in low gear, clutch plate 5 is engaged with drum 2, causing the transmission shaft 7 with sun gears 10 and 15 to run at engine speed. The annulus gear 19 is held from rotation by the locking of brake band 30, the ratio of drive in the rear gear group of sun gear 15, annulus 19, planets 17 and output carrier 20 providing a reduction drive. Shift to second speed ratio is obtained by release of clutch A and engagement of clutch B, while brake 30 remains locked.

This couples carrier 13 of the front unit to the engine. Since annulus 16 is attached to the load shaft 50, the application of engine speed to carrier 13 tends to cause sun gear 10 to rotate ahead faster, which effect is transmitted by sun gear 15. Annulus gear 19 being stopped, a resolution of the coupling occurs in the interaction among the gears 15—17—19 resulting in the drive of output carrier 20 at a lesser reduction ratio than the prior ratio described above, when sun gear 15 alone transmitted the engine torque. The reactive coupling at 10—14—16 may be thought of as a means for dividing the torque through the elements 10 and 16, and that at 15—17—19 as recombining it. This dual torque path arrangement enables the designer to obtain the desired 2nd speed ratio between low and high, with a high efficiency due to the distribution of the friction losses in the arrangement.

Release of band 30 and coupling of clutch A while holding clutch B engaged, applies a direct locking couple through the gears and the rotative assembly then revolves as a unit, at engine speed.

For reverse drive, band 25 of the front unit is locked, with clutch A engaged. This puts engine speed on the sun gear 10 which revolves annulus 16, carrier 20 and output shaft 50 reversely at a reduction ratio.

Transitions between forward and reverse, as for rocking a vehicle out of mud, sand or snow are made by shifting actuation of brakes 25 and 30 while holding clutch A engaged. When the drive in reverse is established, the annulus gear 19 of the rear unit is spinning backwards. Brake 30 may be applied during release of brake 25 without violent torque reaction shocks to the mechanism. When drive is in low forward, carrier 13 is idling forward at an intermediate ratio, and brake 25 brings it down to zero speed. The driver may shift actuation between the bands 25, 30, as quickly as is needed, with no special consideration for torque shock whatever, since as will be understood further, the clutch control system is arranged to ease the sudden application of torques, which assists in preservation of the life of the mechanism and for the ease and comfort of handling this equipment.

A pump P driven by the engine, which may be the engine lubrication pump, provides servo pressure whenever the engine is running. Pressure pipe 101 in Fig. 3 is connected to the aforesaid pump outlet. Pipe 102 is the pump suction line. Pump P' is driven from shaft 50 and supplies pressure line 101 thru line 101' and check valve 99 drawing from a common sump serving both the engine and the transmission assembly.

The present invention provides a control of levels of available pressure in the pump pressure lines from the low idling engine speed pressure up to maximum for performing the work of changing transmission ratio, of controlling the loading of the pistons 6 and 9 for the clutches 5, 8, and the servo pistons 28, 34 shown in Fig. 2 for brakes 25 and 30, and the holding of these pistons in actuating position for maintaining the desired drive ratios.

The flywheel 2 is formed with a web 2a between the driven clutch plates 5 and 8, and annular pistons 6 and 9 are recessed in ring shaped cylinder spaces 22 and 24 in the flywheel, piston 6 being adapted to clamp plate 5 against web 2a, and similarly piston 9 to clamp plate 8 against 2a.

The cylinder space 22 for piston 6 is fed by fluid pressure from pipe 60, passage 61 and passage 62. The cylinder space 24 for piston 9 is fed by fluid pressure in passages 64 and 65, and pipe 66. The space between the plates 5 and 8 is connected by a drilled hole (not numbered) in shaft 7, and a contiguous hole 69 in shaft 1, passage 71 and pipe 70 to pressure relief by a longitudinal space, not shown, in the un-numbered bushing, so that any fluid trapping tendency will be therefore relieved.

It will be noted that annular piston 6 is shaped to meet abutment 2b of the drum 2 and it slides axially with inner and external support on lateral extensions of the drum 2, the outer and inner circumferences having sealing rings 6a and 6b. Actuating pressure for forcing piston 6 to the right is therefore led through passages 60, 61 and 62.

Piston 9 is formed to fit drum abutment 2c. The inner lip of the piston slides on a cylindrical extension of the drum 2, and is sealed with flexible washers 9a and 9b to hold pressure in the space 24 rightward from 9a, as fed through passages 66, 64.

A pressure directing means beyond pipes 60 and 66 is provided to determine when the clutches A or B are to be energized, and the pressure feed to the servo cylinders for the brakes 25 and 30 is likewise so controlled.

One method of control, to be described in connection with Fig. 3 consists of a set of manual valves, a set of pressure level valves and a vacuum servo device connected to operate one of the valves, the manual control being arranged to feed pump pressure to or exhaust same from the clutch lines 60 and 66, and transmission brake lines 141 and 142.

The drive is initiated by locking brake 30 and closing clutch A, as controlled by the manual valving shown in Fig. 3 provided for the operator. As will be described further, drive may not commence until increase of speed of the engine shaft above idling occurs and is not completed until the valve 110 located in the feed line to clutch cylinder 22 is urged by centrifugal force and presses outward to feed port 116, such that the pressure in line 60 and space 22 to the left of piston 6 becomes sufficient to apply clutch A. Under acceleration, valve 110 moves outward rapidly so that the rise of pressure for loading this primary clutch occurs quickly. The action of this valve is described in detail further, in connection with Fig. 9.

The vehicle therefore may move ahead in low gear until the manual control to be further described determines that clutch B shall be engaged and clutch A released.

The braking means of Fig. 2 for bands 25 and 30 are shown diagrammatically, the parts for the reverse band 25 being at the left and for the forward band 30 at the right. The pressure pipes 141, 142 are connected to ports 132 and 134 of brake control valve 130 shown in Figs. 3 and 6.

The bands 25 and 30 are wrapped about their respective drums 12 and 18, and by reason of self-spring action are normally free. As shown in Fig. 2 anchor end 25a of band 25 is fixed adjustably to the housing 100, and the movable end is engaged at notch 25b by strut 26 held in notch 27a of lever 27 and operated by rod 28a of piston 28 in cylinder 29 against release spring 31. Pressure in line 142 applies the band 25, and relief thereof allows the spring 31 and the self-spring action of 25 to release same from the drum. Reference to Fig. 1 shows axial space between drums 12 and 18 at their peripheries, permitting the levers 27 and 33 to swing inward under fluid pressure applied to pistons 28 or 34.

Similarly, the end 30a of band 30 is fixed adjustably to the housing 100, the notched end 30b engaging strut 32 connecting to pivoted lever 33 worked by rod 34a of piston 34 in cylinder 35 fed by line 141, the pressure of which shifts the piston against spring 36.

Figs. 1 and 2 show part sections of the mechanical arrangement for releasing or unloading the clutches 5 and 8, and for creating a centrifugal force to balance the hydraulic centrifugal pressure in the fluid cylinder spaces 22 and 24 of the clutch pistons. A plurality of springs 79 are seated in apertures in the web 2b of the flywheel 2 and press the radially-adjacent angular cam weights 80 outward at 85. The cam portions 81 and 84 of weights 80 react against the abutting lips of the pistons 6 and 9 fulcruming on extension 82 of plate 9, so as to move the pistons axially away from each other, thereby freeing the plates 5 and 8 from drag.

The cam relationship, with the spring and other forces involved, is taken so that a staging of clutch action commensurate with the shift sequence is obtained. This arrangement provides counterbalance force for the centrifugal effect of the mass of the oil trapped in the passages behind the clutch pistons.

Heretofore, in multiple clutch drives, a general and common difficulty occurred in maintaining clutch driving plates free from drag, and the above feature provides camming-out means for the loading pistons 6 and 9, so that there is no appreciable plate drag, even at either low or high engine speeds. The mass values of the cam weights 80 balances centrifugal pressure head created within the passages 61, 64 and spaces 22, 24 by rotation of the drum 2.

The springs 79 serve another important purpose, that of determining pressures at which the clutches start to engage, the range of pressures over which they are allowed to slip, and the point at which the engaging force is sufficient to carry a predetermined torque.

Fluid pressure force, for example, applied to piston 6 is resisted by the cam part 81, the weighted lever 80, rocks about pivot 84 and cam portion 85 located at a greater distance from 84 works at what might be called a mechanical disadvantage, against springs 79. This spring resistance is met in the clutch cylinder 22 by a rise in pressure. With increased speed, the weighted arms 80 do not add to the resistance to be overcome, and at increased engine speeds the pump pressure required to engage the clutch 5 is not higher; even when the external portions of the weights abut the rim of the flywheel 2.

The pump P of Fig. 3 may be driven by the engine through common means, as available today by couplings and gears from the rotating engine parts, such as for lubricating the engine. It is desirable to precede both the pumps with a suction line filter, so that the oil reaching the delivery line 101 or outlet, is reasonably free of dirt or sediment.

There are three line pressure regulator valves controlling the output of the pump, each operating in a separate branch of the flow, the branches being led to the ratio selection valving in a pattern which provides for different levels of operating pressure to meet for different torque capacity needs of the transmission brakes and clutches.

The lowermost of these valves in the Fig. 3 diagram, is pressure-divider valve numbered 160, and is located in a casing 161 having four connections, inlet, exhaust and two delivery outlets. The valve 160 has an upper boss $u$ and a lower boss $v$; the upper one having a slightly larger area than the lower. Spring 162 normally holds the valve 160 in its upper position, except as the pressure conditions modify its positioning. Upper space 163 is connected by line 106 to port 124 of valve 120. Pump feed line 103 connects to cross port 164 feeding line 107 leading to port 126 of valve 120. The lower spring recess under the valve 160 is open to exhaust at 165.

A small drilled passage 166 in the valve 160 may be used to connect the space 163 above the lower recess connected to cross port 164.

Initial line pressure of "maximum" in feed line 103, acting differentially on the larger and smaller exposed bosses of valve 160 and against spring 162, tends to maintain a port opening around the boss $u$ such that the pressure in space 163 rises to a selected fractional pressure value, and tends to close the valve upon a rise beyond that chosen pressure value so that the action is that of a dynamic pressure reducing valve. Assuming a uniform line pressure in lines 103, 107 and in port 164, the pressure delivery to port 124 of valve 120 will always be reduced, the valve acting as a pressure-divider.

As will be understood in detail further, the ratio control valve 120 may then alternate between admitting either the maximum or a reduced pressure to cross port 133 and thereby provide two separate pressure values for energizing the reaction brake piston of the low speed ratio brake.

The reverse reaction brake piston 28 is fed maximum pressure only, by valve 130 connecting ports 133—134.

Above the pump, in Fig. 3, is shown regulator valve 170, in body 169. The valve 170 has a spring abutment $x$ and a lower boss $y$. Chamber 171 houses adjustable spring 172 pressing the valve downward, and chamber 173 is connected to line 104 having branch line 105 but connected to feed port 122 of valve 120. This line 104 supplies "intermediate" pressure to operate the clutch pistons 6 and 9 of Fig. 1.

The pressure value of the "intermediate" pressure does not remain at a given level, but is varied in accordance with the variations in torque demand, and a third valve 150 is furnished for this purpose.

Valve 150 located in valve body 149, is formed with a tapered seat 151 closing upward against the pressure delivered from valve 170, in line 105 connected to chamber 152. Port space 153 connects to line 108 leading back to the suction line of the pump P. Adjustable tension spring 155 recessed in fitting 149a is attached to the upper end of valve 150, and opposes the pressure in chamber 152, so as to seat or partially close the valve upward.

The lower end of the valve 150 is fastened to diaphragm 156, closing chamber 158 from space 157, and compression spring 158a in 158 bears against the under face of the diaphragm retaining washer 157a, while pressing downward against retainer 159, adjustable by a fitting located at the lower end of extension of the valve body 149b.

Space 158 is connected to the engine manifold (not shown) by a pipe connected to port 149c so that variations in manifold vacuum will vary the effective oil pressure in lines 104 and 105 in accordance with variations in the engine power. This is accomplished by varying the leakage at seat 151 of valve 150, the variable pressure drop being reflected in all of the lines connected to pump output line 101.

The valve 150, spring 155 and diaphragm 156 operate as a dynamometric device or tell-tale, responding to torque variations for controlling the relief action at 153, and thereby the modulation of the effective pressure in the passages connected to space 152 and line 105. The manual control valve body 119 shown in Figs. 3 and 6 in section is open at one end for the parallel bores for valves 120 and 130.

The valve 120 at the left in Fig. 3 and at the right in Fig. 6 is formed for attachment of the external control means at 120a, and there are four bosses, $a$, $b$, $c$, and $d$ in order therefrom. The valve is bored at 120g centrally, and there are intersecting side passages 120e and 120f across the bosses $b$ and $c$ respectively.

The porting of valve 120 in body 119 is arranged with input ports from the controlled supply source, outlet ports to the two clutch cylinders, and a cross feed port 133 leading as shown in Fig. 3 to valve 130 which controls the pressure supply to the brake cylinders.

The seven ports from bottom to top in Fig. 6 are 121 for feeding clutch cylinder 24 via line 66; 122 inlet from the feed line 104; 123 leading to clutch cylinder 22 via line 60; 124 inlet from feed line 106; 125 to cross port 133 delivering to the planetary brake control system; 126 inlet from the feed line 107; and 127 a supplementary delivery port to line 66 for clutch cylinder 24.

Valve 130 for controlling the transmission brakes, is formed at 130a for attachment of the external control means, and has three bosses, $e$, $f$ and $g$ in order from bottom to top in Fig. 6. Its bore has five port spaces, in this sequence, 131 open to exhaust; 132 leading by line 141 to the forward reduction brake cylinder 35; 133 receiving input feed from port 125 of valve 120; 134 connected to line 142 for reverse brake cylinder 29 and 135 open to exhaust.

As shown in Fig. 3, by the horizontal lines marked "Low," "2nd" and "High," the valves move down from the indicated "Low" speed ratio positions for changes to 2nd, and High. In the low ratio setting the feed from line 107 enters port 126 of valve 120, passes from port 125 to port 133 of valve 130, and is delivered to line 141 leading to cylinder 35 of low speed brake 30. Because of the magnitude of the torque reaction force for low gear drive, this is, in the described system a high fluid pressure connection. The pressure feed from the intermediate pressure line 104 enters port 122 of valve 120 and is delivered by port 123 to line 60 feeding clutch cylinder 22.

As will be understood further, movement of the controls to "neutral" maintains pressure in clutch line 60, but valve 130 is shifted to shut off the flow from port 125 to port 133, and relieves brake cylinder line 141 and port 132 to exhaust at port 131.

The horizontal lines marked at the right of valve 130 "Low," "Neutral" and "Rev." indicate the positions of the valve for these ratio shifts. It will be observed that the sequence of the shift pattern is from bottom to top by three steps for valve 130 to establish reverse, neutral and low, and for valve 120 to move from top to bottom by three steps for low, second and high selection action.

Valve 130 having been placed in upper position for "Low" remains there for "2nd" and "High," the movement of valve 120 to "High" cutting off the cross feed to port 133 when it is moved to the end point position.

Valve 130 is moved between its limit position and its central position for shifts to and from "Neutral," and enables the operator to rock the vehicle out of sand or mud by continuous resetting of valve 130 only, as will be further apparent with study of the external control mechanism.

Movement of valve 120 to "2nd" position connects together ports 121 and 122, feeding pressure from line 105 to line 66 leading to cylinder 24 of clutch 8. Cross port 120e of valve 120 comes opposite port 123 of clutch line 60, releasing the pressure to disengage clutch 5. Ports 124 and 125 are connected, joining line 106 to the brake cross port 133 to feed a lower pressure to brake line 141. It is desirable in second speed ratio to reduce the torque reaction holding force in a proportion representing the gear ratio of torque differential.

Moving of valve 120 to third or top gear position cuts off the pressure from brake 30, applies pressure to clutch A, and raises the pressure on clutch B to full line pressure.

In 2nd speed, feed line 106, ports 124, 125, 133 and 132 had supplied brake line 141, and cross port 120f was blocked between ports 125 and 126. Movement of valve 120 to 3rd speed position blocks feed from line 106 and the cross port f connects 133 to exhaust, which releases pressure in brake cylinder 35 on piston 34, the springs 36 serving to force the fluid out quickly through the exhaust passages.

Clutch B has been engaged in 2nd speed by the pressure in line 66 from ports 121, 122 and feed line 104 while the delivery line 60 for clutch A has been connected to exhaust by cross port e of valve 120.

Down shift of valve 120 to 3rd position isolates exhaust cross port e between ports 122 and 123, while port 123 becomes connected to 124 and to feed line 106 to deliver pressure to line 60 and cylinder 22 of clutch A. Meanwhile the feed from line 104 to port 121 of line 66 for clutch B has been cut off and the full pump line pressure from 107 has been admitted through ports 126, 127 to line 66.

In Figs. 1 and 2, the web 2c of flywheel 2 is shown recessed for valve 110. The valve 110 is for the purpose of applying a speed response regulation to the torque capacity of the clutch A. It is located in a bore of the flywheel drum 2, and retained by ported sleeve 111 held in place by screw collar 112, as shown in Fig. 9.

The sleeve is bored to two internal dimensions to accommodate the valve 110, and is cross ported at 113 for exhaust, at 114 for clutch exhaust, at 115 for pressure feed connection, and at 116 to connect with the outlet of port 115, and leading to passage 62 for clutch cylinder 22.

Valve 110 has bosses a and b of one diameter, and boss c of larger diameter, and is weighted at 117, the weight being attached by a common lock screw. The valve 110 operates as a centrifugal valve or as a speed-responsive element.

The adjacent passage 62 is equipped with an adjustable screw valve 62b to afford exact control of the pressure flow into and out of passage 62. The sleeve 111 is held from rotation by locating lug 118 recessed in the body of the drum 2.

The valve 110 receives line pressure in port 115 connected as described herein to clutch feed line 60 of Figs. 1 and 3, and under rotation of drum 2, the mass of weight 117 added to the mass of the valve and that of the body of oil radially inward of boss c, all provide an outward force component resulting in the admission of pressure to port 116, while the upper face of boss b closes off port 114 from exhaust 113.

Directed pressure from line 60 is therefore available to apply a loading pressure to clutch piston 6 in cylinder 22 and cause torque to be delivered to the shaft 7 of the sun gears 10 and 15.

The lower or inward face of boss b is of smaller diameter than the adjacent upper face of boss c and consequently the effect of the pressure delivered by port 115 is to tend to move the valve 110 inward with a force which may be described as a differential pressure. When the speed of drum 2 falls to a given low value, the differential pressure effective upon the upper face of boss c of valve 110 provides a force greater than the centrifugal force, and the valve moves inward connecting ports 113 and 114, thereby relieving the pressure in line 62. Since the clutch release springs 79 of Figs. 1 and 2 are immediately effective to force the piston away from contact with plate 5, whenever the fluid pressure in 62—22 is released, and since the centrifugal effect on the body of oil moved by the piston is added to the force available to relieve the pressure, the release of clutch torque occurs rapidly, and the fluid drains freely at port 114.

Whenever there is a sudden fall in speed of drum 2 the valve 110 will open clutch line 62 to exhaust at 113. It is obvious that the differential pressure effect enables the valve to operate without what may be termed a "governor" spring. The differential areas of bosses b and c are taken with respect to each other, to the line pressure range within which the clutch is to operate and to the engine speed characteristics, so that full release of the engine from the load occurs without stalling the engine, such as would be desirable when the vehicle brakes were suddenly applied.

The relative value of the differential pressure effect to the speed effect is a matter of design, and the combined effect may be utilized as a starting control for moving the vehicle from rest, as a ratio-shift transition control upon clutch loading pressure during the shift interval, and if desirable as a continuing control constantly operating during the entire drive period. If the latter is desired, the clutch line pressure variation provided by the centrifugal valve 110 may be proportionalized so that its controlled range of leakage at port 113 extends over a high percentage of the normal driving range. This proportionality is likewise a matter of design. In the case of the controls of a vehicle main clutch such as shown by Maybach U. S. 2,144,074 issued January 17, 1939, the clutch is only used for picking up and releasing the vehicle drive, and no requirement for inter-ratio shift is established.

Clutch A in the present disclosure, is not only used for picking up the drive, but is released for the next ratio and is re-engaged for the top gear drive. It must therefore serve at one time as a vehicle starting clutch, and at another time as an inter-ratio shift clutch.

Since it is desired that a smooth ratio transition without releasing torque be provided, the net effective clutch loading force which is exerted on clutch A is therefore conditioned by the existing torque requirement for the particular transmission ratio sustained by the clutch, and further by the power conditions existing at the time of ratio shift.

The use served by valve 110 is therefore twofold, first to determine the primary interval of clutch engagement and disengagement, and second, to take part in the regulation of clutch loading pressure during a portion of variable ratio drive.

The centrifugal valve 110' for regulating the loading of clutch B is identical in principle with valve 110, but its weight 117' may be made smaller. Upon sudden deceleration, valve 110' would lose its centrifugal force effect first, and open line 64 for clutch B to exhaust before valve 110 connected the cylinder 22 of clutch A to exhaust at port 113.

Should the manually controlled valve 120 of Fig. 3 be positioned to deliver pressure to clutch B, the vehicle may be started from standstill by the action of valve 110', but since its weight 117' is less than 117, the speed at which the clutch B is energized with a given loading is higher, so that the engine torque available will be high enough to avoid stalling, for the available engine torque will be greater at a higher speed.

This general form of centrifugal valve is shown in Letters Patent to W. L. Carnegie, U. S. 2,221,393 issued November 12, 1940, where it is used to regulate the variable starting torque controlled by the transmission friction band. It is further shown as a control for the ratio shifter valving in Letters Patent U. S. 2,204,872 issued June 18, 1940, to Earl A. Thompson.

The centrifugal valve 110 is proportioned with a closing relationship, outward radially with respect to port 114, so that with increased speed, the closing force resulting from its mass and speed becomes greater, tending to seal off the leakage path for oil around the valve to exhaust passage 113, which causes a rise of pressure therefore in feed passage 62 leading to cylinder space 22 behind piston 6, from the feed line 60 of Fig. 3.

Valve 110 by its centrifugal action conditions the effective loading pressure on clutch 5 and thereby varies the torque capacity of the clutch in accordance with speed.

Valve 110' seats radially to close port 114', prevents exhaust at 113' and creates a rise of pressure in passage 64 feeding cylinder 24 of piston 9 which loads clutch B for driving. The valve 110' is radially operative with a force varying with engine speed similar to valve 110 noted above.

Both valves 110 and 110' close against the existing pressures in the clutch feed lines and cylinders, and therefore respond to the fluid pressure conditions as determined by the controls between the pump supply and the feed passages 62 and 64.

The valve 110' for clutch B is arranged by its design factors to respond for closing the port 114' so as to become effective at a lower speed than that at which valve 110 functions to yield a particular loading pressure characteristic.

Assuming the pressure cut off from line 60, the body of fluid trapped to the left of the piston 6 possesses centrifugal force. The spring-and-weight system arrangement at 79—80 is required to release the plate 5 with no drag whatever.

The admission of pressure to line 66 initiates the loading of plate 8 by piston 9, and the speed effect on valve 110' causes the fluid pressure load thereon to be expressed as a speed factor of given value.

The split-second interval when torque on clutch plate 5 ceases and is all assumed by plate 8 is preceded by a short interval when torque is momentarily being carried on both plates.

This is accomplished upon upshift to 2nd by the valve 120 and its action. When the ratio pressure directing valve 120 exhausts line 60 and delivers pressure to line 66, the pressure level desired is already available for loading piston 9.

This line pressure being exerted to move the piston 9 and overcome the resistance of weights 80 and springs 79 of the clutch release mechanism of Fig. 1, must also build up in accordance with the timing effect of the orifices as controlled by valve 120, and these orifice values are taken so as to avoid sudden assumption of torque by clutch 8. A further factor assists this action.

Time must be allowed for the pressure condition within the spaces 22 and 24 and to permit piston 9 to move over and load the clutch plate 8, and to release the piston of plate 5.

The delivery of pressure to line 66 by clutch control valve 120 simultaneously connects line 60 to exhaust through the cross port 120e and the hollow center of valve 120 from port 123. The small area of the outflow passages in the cross porting establishes a dwell in the relief of the pressure behind piston 6.

The invention therefore provides a control which conditions the automatic action derived by pressure from the pumping system, and without reactive force upon the manual controlling means.

Fig. 4 labeled "Ratio Shift Pattern" shows the pressure stages for all of the ratio control stations determined by valves 120, 130 for the transmission clutches and brakes, designating the feed line from which the pressure is derived for each, by the insignia "×."

For convenience, "maximum" pressure range is considered that delivered direct by the pump to line 107. This pressure range is used in the low and reverse brake cylinders and in clutch cylinder 24, for high gear drive.

It will be noted that the clutch A valve connections and feed line are pressure-fed when the Fig. 6 valving is set for neutral.

The fractional pressure range is the lowest of the three stages of pressure level ranges, and may be considered as "low" pressure. This is used in the low ratio brake cylinder for 2nd gear operation, and in the clutch cylinder 22 during high ratio setting.

"Intermediate" pressure range as noted herein is furnished entirely by line 105, and is used exclusively in clutch cylinder 22 for reverse, low and neutral, and in clutch cylinder 24 during 2nd speed drive.

Studied in conjunction with the foregoing description of the operation of valves 120 and 130 in connection with Fig. 3, Figure 4 clarifies the shift pattern herein, believed novel in transmission controls.

In Fig. 5 the drawing shows the control valve casing 119 bracketed to steering column 200. A mechanical lever device is provided in compartment 119a, operated by control shaft 220 for moving the valves 120 and 130 shown in Fig. 3. Fig. 6 shows the internal connections of the control elements.

The Fig. 7 view, taken at 7—7 in Fig. 6 shows the detail of the mechanical interlinkage.

Plate 201 keyed to portion 202 of shaft 220 is formed with two radial arms 201a and 201b pivoted to links 202' and 203 which are in turn pivoted to the valves at 120a and 130a, so that rotation of plate 201 positions the valves at various port connecting stations.

To assure proper port registry of the valves for the required control stations, a cam plate 205 is attached outside casing 119a to shaft 220, and its cam notches project to the left beyond the casing 119a, in Fig. 5, where they are intersected by roller 206 of arm 207 pivoted at 208 to valve casing 119, the adjustable tension spring 210 being anchored by screw fitting 211 and exerting a measured pull on the arm 207 for loading the roller 206 against the cam plate 205.

The angular positions of the notches are taken to correspond to the valve stations for the control functions required.

Referring back to Fig. 3, it will be understood that in the forward drive control sequence from low to high, valve 120 progressively emerges from the casing 119 while valve 130 remains in its inner position; and that in the sequence from low through neutral to reverse, the valve 120 remains in its inner position while 130 emerges progressively.

The angular relationship of the arms 201a and 201b of plate 201 with respect to the longitudinal motion of the valves, and the degrees of motion of shaft 220, permit valve 120 to be moved downward in Fig. 6 from the "low" position shown, while valve 130 for all practical purposes remains in the port station shown. Conversely when the shaft 220 rotates plate 201 counterclockwise, valve 130 emerges from the casing 119 while valve 120 holds to its port station shown.

This is a simple and neat arrangement for dividing these shift control functions.

Referring to the above rotation-longitudinal action of Fig. 5, it will be obvious that when roller 206 of arm 207 lies in notch r, the valve 130 will be in its outermost position, corresponding to "reverse" in Fig. 4, and when the roller lies in notch h, the valve 120 will be in 3rd or "high" position.

Fig. 8 is a perspective view of the structures of Figs. 5 to 7 as installed in a motor vehicle, with the bracket 249 supporting the ratio shifting handle 250 at a point convenient to the operator's hand. The piping connecting the valve body 119 with the control system of Fig. 3 may be put in a conduit for convenience and protection, as required. Swinging of the handle 250 rotates shaft 220 for the ratio shift control functions described above. The handle 250 may be regarded as a single selector operating means, or the shaft 220, with the affixed plate element 201.

Assuming that the car driver may shift the valve 120 to relieve the pressure in cylinder 22 while applying it to cylinder 24, for releasing clutch 5 and engaging clutch 8, and that this is done with no change in engine throttle, the clutch pressure, labeled herein "intermediate" is cut off from line 60, and delivered to line 66. Since the torque for the fixed engine speed now is to be recoupled at a lesser mechanical advantage because of the higher transmission ratio, the engine tends to slow down slightly, so that the existing pressure from the pump in delivery line 101 drops, and in the connecting passages such as 104 and 105. At the same time the degree of engine vacuum will diminish, this effect operating to change the vacuum loading on the underside of the diaphragm 156 of valve 150. The force of springs 155 and 158a is therefore varied, and the resultant effect is for the valve to rise and close off the port 151, creating a rise of pressure in 104, 105, in the control line 66, and in clutch cylinder 24.

The drop of pressure caused by slowing down the engine is partially compensated for by the dynamometric change in the degree of vacuum.

Assuming that the engine is started and that pump P of Fig. 3 is operating, the line pressure in pump outlet 101 is sufficient at idling to open valve 170, against spring 172 and to apply pressure in lines 104, 105 and 103. The valve 160 begins to function differentially providing fractional pressure in port 124 and maximum pressure in port 126 of valve 120. Since the degree of vacuum in the engine manifold is relatively high at idling, and will diminish as torque is applied or the throttle opened, and equilibrium will be established between the force of the idling vacuum below diaphragm 156 and the force of springs 155 and 158a, resulting in cracking valve 150 so as to establish a given lower line pressure in 104 and 105, carried on through port 122, transmitted through port 123 to line 60, and clutch cylinder 22.

With valve 130 now in neutral position, there is no drive since neither of brakes 25 or 30 are energized. The driver may warm up the engine by opening the throttle, which causes a variation of degree of vacuum force in chamber 158 below valve 150, and also causes a rise in pump line pressure in 101 and connected passages. The actual available loading pressure range on clutch 5 by piston 6 may vary between predetermined design limits.

Shifting of the controls of Figs. 5 to 7 to 2nd speed ratio moves valve 120 down to the 2nd position shown in Fig. 3, delivering maximum line pressure from 103—107 and port 126 to port 133 and line 141 whence piston 34 in cylinder 35 is loaded with full pump line pressure. Since the loading of clutch 5 by piston 6 is with a predetermined reduced pressure conditioned by the state of the engine manifold vacuum, the torque reaction at once assumed by band 30 is of a higher relative value than the torque capacity of the clutch 5, whereupon clutch 5 will slip momentarily, until such time as the effective clutch loading pressure rises in cylinder 22 for the clutch to sustain its full torque without slip.

Attention is directed to the action of valve 150 controlled by the engine vacuum. The springs 155 and 158a are always endeavoring to close the port 151 for building up the line pressure in 104—105 to maximum, whereas a high degree of vacuum draws the diaphragm 156 down, to open the valve 150, reducing the net effective pressure in 104—105. As the engine throttle advances, and torque is transmitted, the degree of vacuum force diminishes to permit the calibrated springs 155 and 158 to increase their force for closing the port 151 and causing a graduated rise of pressure in 104—105. This action correlates throttle opening and engine torque with the loading pressure determining clutch capacity so that regardless of the instantaneous power being delivered the ratio shift and the take up of clutch torque always proceeds with smoothness.

In addition, the valve 110 exposed to clutch loading pressure in passages 60 and 62, seats with a force depending upon engine speed, so that if the operator has suddenly depressed the accelerator pedal to full throttle position, the quick rise of engine speed will cause valve 110 to connect line 62 to full line pressure which results in a fast rise of clutch loading pressure on plate 5.

The clutch piston 6 is therefore subject not only to variable pump pressure, and to variations in torque demand, but also to speed, during the drive initiating operation.

One of the difficulties in the past, with transmission ratio changing clutches controlled by centrifugal means has been their tendency to hang or linger in engagement when the vehicle is suddenly decelerated, due to a desire on the part of the designer to maintain higher gear drive down to a low vehicle speed. The present invention solves this difficulty by utilizing the quick release effect of the centrifugal valves for the clutches assisted by the variation of vacuum force acting on the line pressure control valve 150. With the present invention, it is possible to brake the forward motion of the vehicle suddenly, and obtain clutch release quickly, and as quickly restore drive by accelerating the engine, without changing speed ratio, or stalling the engine.

The control operation of a vehicle equipped with this invention is simple and foolproof. There is no main clutch and no need for one.

The drive mechanism is fully protected against whatever an inexperienced driver may do.

When the engine is started, pump P provides servo and control pressure. The valves 120, 130 are positioned such that no drive can occur, the valve 120 delivering pressure to feed line 60 for clutch A from line 104, and delivering pressure from line 107 to cross port 133, but valve 130 blocks 133, leaving both the planetary brake lines 141, 142 connected to exhaust.

If the operator desires to warm up the engine, the spinning imparted to plate 5 serves to break the static frictions of the other drive assembly elements, and whatever air may have been trapped in the system is expelled and the active servo spaces filled.

Shift of the manual control to low energizes brake 30, and the centrifugal valve 110 operates to build up the pressure on clutch A as engine speed rises, as described preceding, the low gear torque thereupon being developed on shaft 59, to move the vehicle, whereupon pump P' begins to contribute pressure to the servo feed system, via line 101' and check valve 99. Shift to 2nd speed ratio cuts off the pressure from line 60 of clutch A and feeds pressure to line 66 of clutch B while brake 30 remains engaged, and valve 110', designed to become effective at a higher engine speed, regulates the timing of engagement of clutch B.

If during these operations the engine throttle is being advanced or retarded, the dynamometric rise or fall of the engine manifold degree of vacuum moves diaphragm 156 to relieve or restrict pressure in lines 103, 104 and 105 so that the net effective pressure on the clutches A and B in the brake cylinder 35 is increased or decreased with torque demand, which provides against excessive clutch slip, and further, assures that the existing torques during a shift interval will be within predetermined differential values, which expedient avoids shock on the drive mechanism.

This enables the operator to utilize a full engine torque shift since the drop in vacuum force acting on the diaphragm of valve 150 of Fig. 3 causes the valve to close and provide an immediate rise in the servo line pressure sustaining the clutches and the reaction brake 30.

Shift to 3rd, releases the brake 30, and reapplies the clutch A, to establish direct drive.

The hand control of Figs. 5 to 8 may be maneuvered at will to suit the driving needs, and the regulation of the torques, the required division or overlap of the torques between the clutches, and the torque reaction force on the brake 30 occurs automatically so as to eliminate shock, as described.

This description is not theoretical, but represents actual experience with the structures herein described, and similar structures, extending over a long time period of tests.

The shift to reverse from neutral merely delivers pressure from line 107 through cross port 133 to line 142 for cylinder 29 of brake 25, while clutch A connects the engine to shaft 7, as hereinbefore described, and the vehicle may be handled over soft or slippery surfaces with facility, in forward and reverse shifts, since the refined control over the action of clutch A provided by valves 150 and 110 eliminates sudden torque changes which might otherwise lose traction.

Attention is directed to fluid pressure connection 98 in Fig. 1 between clutch pressure passage 62 and the inner end of valve 110'. The passage 98, whenever there is clutch loading pressure being exerted in 62, delivers pressure to the inner face of valve 110', simulating centrifugal force in shifting valve 110' to its outermost position. When the passage from port 116' of valve 110' is delivering manually directed pressure for loading clutch B, if there is pressure in passage 62, valve 110' will be in outer position, and clutch B is in effect controlled for loading by the status of pressure in the other clutch loading line 62. When direct drive is to be had, the clutch B will be controlled for loading, in part by the operation of the loading pressure directed to clutch A, and conditioned by the speed effect on valve 110.

The cross-connection 98 is a useful feature not believed shown in the prior art. The selective adjustment feature of the pressure level ranges for the clutches and brakes with changes in the selection of ratio by the manual ratio-shift valving is likewise believed novel.

The present invention, by virtue of the features described, provides unusual advantages in ease of manipulation of the drive controls, since the relative torques required to be handled by the clutches are wholly automatically controlled over the entire speed ratio and power range of the vehicle power plant for all of the driving conditions of acceleration, deceleration, steep gradients, sudden stops and rapidly changing traction.

The advantages of the particular form of combination planetary gear and double-input clutch drive are believed obvious as set forth above, and as stated at the beginning of this specification. The novel disclosure of the fluid pressure control system, in which there is complete manual selection of ratio, and automatic actuation graduating the initial and ratio transfer torques, is believed clearly set forth herein so that persons skilled in the art may now build devices like the one described, in which wholly smooth changes of ratio may be made at will, at all times, without stalling the engine, without excessive clutch slip or abrupt torque shocks, which advantages are well-known as desirable.

The references made herein to the patents to Small and Nagel, to Maybach, to Carnegie and to Thompson are for the purpose of showing proper art background for features of improvement hereinabove described, and the specifications herewith claims appended are believed to describe the present invention as distinct from whatever inventions are embodied in the stated references.

The present invention has particular utility when installed in a relatively light-weight vehicle having a fast engine of high activity factor, since the operational results give exceptional usage for quick acceleration or deceleration, high speed drive and quick maneuvering such as required of military "jeeps," police cars, light combat, dispatch and emergency vehicles of equivalent operating demands.

It is to be observed that in the installation, as above described, there is little to wear out, nor need for frequent service, since the adjustments of the system once determined stay as set, indefinitely, and because all parts run in a constantly renewed oil bath, there is always lubrication, and opportunity to conduct heat away.

It is to be understood that while the invention has been described in connection with a specific embodiment, the principles involved are available for numerous other applications which after knowledge of the herein described invention is obtained by persons skilled in the art, will readily find adaptation in equivalent forms. The invention is therefore to be limited only as described by the scope of the appended claims.

What I claim is:

1. In compound planetary gearing, in combination, output and input shafts, a first planet gear group and a second planet gear group adapted to transmit torque between said output and input shafts, a transmission shaft having two affixed sun gears each in one of said gear groups, planet gears in each group meshing with the respective sun gears and mounted on individual carriers, meshing annular gears for each of said groups; a permanent cross connection between the carrier of said first named group, the annular gear of said second named group and the said output shaft; a reaction drum for the annular gear of said first group, a reaction drum for the carrier of said second group, separate braking means for each of said reaction drums, a clutch mechanism operative to clutch alternatively said input shaft to the said transmission shaft, to the said reaction carrier drum of the said second named group or to both the transmission shaft and the said second group reaction drum simultaneously for direct drive between said output and input shafts, when said braking means is held inactive and a control device for said clutch mechanism and said braking means operative to cause clutching of said input and transmission shafts while applying the said brake to the drum of the said second group carrier for establishing reverse drive of said output shaft, said device including a single selector operating means.

2. In compound gear drives, in combination, driving and driven shafts adapted to be coupled by two compound coupled planetary gear groups each group having a sun gear, an annulus and meshing planet gears supported on a carrier, the sun gears of the groups being connected together for common rotation, the carrier of the first of said groups being permanently connected to the annulus gear of the second group and to said driven shaft, a drum for the carrier of the second of said groups, a drum for the annulus of the first of said groups, a double clutch mechanism supported on said driving shaft and adapted to couple clutch members affixed respectively to the said commonly connected sun gears and to the said carrier drum for the second of said groups alternatively or both together, braking means operative to hold said drums selectively against rotation for reduction gear drive between said shafts when only one of said clutches is engaged and a control device for said clutch mechanism and said braking means effective in one position to cause clutching of said connected sun gears with said driving shaft and to cause braking of said second group carrier drum for establishing reverse drive of said driven shaft, said device including a single selector operating means.

3. In compound planetary gearing, a drive shaft and a driven shaft, two planetary gear units adapted to couple said shafts for compounded forward and reverse gear drive, the first of said units consisting of a sun gear affixed to a transmission shaft, meshing planetary gears mounted on a carrier having a reaction drum, and an annulus gear, the second of said units consisting of a sun gear likewise affixed to said transmission shaft, with meshing planetary gears mounted on a carrier affixed to said driven shaft, and an annulus gear having a reaction drum; a clutching mechanism mounted on said driving shaft adapted to engage the transmission shaft or to engage the said last named reaction drum, said mechanism being arranged to cause said reaction drum and said transmission shaft to rotate together at unit speed with the said driving shaft, or to be individually coupled to said driving shaft, a reaction brake for said annulus drum, a reaction brake for said carrier drum, and actuating means for said annulus reaction brake and said clutching mechanism, operative to provide plural forward reduction drives through the gearing of said units when said annulus reaction brake is applied and when either of said carrier drums or said transmission shaft are clutched to said driving shaft by said mechanism.

4. In power drives, in combination, input and output shafts, a transmission shaft, a first gear group consisting of a sun gear attached to said transmission shaft, a reaction annulus gear and meshing planet gears mounted on a carrier attached to said output shaft; a second gear group consisting of a sun gear attached to said transmission shaft, an annulus gear attached to said output shaft and meshing planet gears mounted on a reaction carrier, drums for said reaction annulus and carrier, clutch members on each of said transmission shaft and said carrier reaction drum, clutch mechanism on said input shaft operable to engage said members individually or both together, braking means to lock the said reaction annulus against rotation to provide a forward low gear drive ratio between said input and output shafts derived from rotation of said first-named sun gear applied to said first named carrier while engaging said first named clutch member, and clutch control means to release the said first named clutch member and to engage the said second member while continuing to hold said annulus against rotation, to provide an intermediate forward gear ratio between said input and output shafts derived from rotation applied to said reaction carrier compounded by the coupled sun gears and between the said first named carrier and the said second named annulus.

5. In variable speed ratio drive assemblies for motor vehicles, the combination of driving and driven shafts and a transmission shaft adapted to be coupled to both said driving and driven shafts by a compound planetary gear assembly consisting of two internally coupled gear groups, one internal cross-coupling being permanently affixed to the driven shaft and a second cross-coupling being permanently affixed to the said transmission shaft, a forward reduction drive reaction element, a reverse reduction drive reaction element, selective braking means one for each of said elements, a first clutch means effective to couple said driving and transmission shafts for reduction forward drive when said first named element is braked and also effective during a second engaging interval to establish reverse drive, a second clutch means engageable together with said first-named clutch means when said first-named element is released to provide one-to-one drive, and control means operative upon said selective braking means to lock said second named element against rotation during said interval while causing engagement of said first-named clutch to provide reverse drive.

6. In power transmissions, the combination of a power shaft, an output shaft, a transmission intermediate shaft adapted to be coupled by a compound planetary gearing assembly composed of two groups, the first planetary group having a sun gear affixed to said intermediate shaft, a reaction annulus gear and meshing planet gears mounted on a carrier affixed to said output shaft; the second planetary group having a sun gear of lesser diameter than that of the said first named sun gear and affixed to said intermediate shaft, a reaction annulus gear affixed to said output shaft and meshing planet gears mounted on a reaction carrier, coupling means for transmitting the power of said power shaft to said intermediate shaft and to said reaction carrier, drums for each of said reaction annulus and carrier, braking means for each of said drums operable to lock alternately said reaction annulus and carrier against rotation to provide reduction gear train drive of said output shaft at forward and reverse ratios respectively, and actuation means for said braking and said coupling means effective to provide intervals of selective engagement of either of said clutches during which intervals the said braking means are actuated to hold said reaction annulus gear against rotation.

7. In power controls, a driving shaft and a driven shaft, a compound variable speed ratio transmission coupling said shafts and having two input sun gears members, an output member connected to said driven shaft and two reaction elements, a first clutch adapted to drive said input sun gear members from said driving shaft, a second clutch adapted to drive one of said reaction elements, reaction locking means for said elements, means to actuate said clutches alternately while said reaction locking means is effective to hold one of said elements against rotation to provide reverse drive of said driven shaft, and actuation control means for said clutches embodying a single acting member effective to establish selective reduction gear drive by alternation of actuation of said clutches for drive at two separate forward reduction speed ratios.

8. In power transmissions, the combination of a driving shaft, a driven shaft, a compound planetary gear assembly coupling said shafts and having two input sun gear elements, two reaction elements and an output element connected to said driven shaft, clutching means for alternately or jointly connecting said input elements to said driving shaft, braking means for selectively and alternatively stopping said reaction elements against rotation, and control means including a single selector control mechanism operative upon said clutching and braking means and effective to provide low and intermediate gear drive by alternation of clutching of said input elements during positive stopping of one of said reaction elements, to provide direct drive by clutching both of said input elements while releasing of said reaction element, and to provide reverse drive by clutching that input element which was clutched for low gear drive while stopping the other one of said reaction elements.

9. In power transmissions, the combination of a power shaft, a load shaft, a compound planetary gearing assembly including output connected elements, two input sun gear elements and two reaction elements, and arranged to provide reduction speed ratio drive between said shafts when either of said input elements is clutched to said power shaft and one of said reaction elements is held against rotation for providing forward drive of said load shaft, the other of said reaction elements being adapted to be stopped for establishing reverse reduction drive between said shafts, the first named reaction element being adapted to be stopped for establishing reduction drive between the shafts, a clutch for coupling the said power shaft to one of said input elements connected to said reverse reaction element for intermediate reduction drive, a second clutch for coupling said power shaft to the other of said input elements for low speed drive, and control means including a single selector control mechanism effective for stopping said reduction reaction element and engaging said second named clutch for providing initial drive from no-drive to low speed forward, and for releasing said second named and engaging said first-named clutch to provide a change of drive to intermediate reduction ratio drive thereafter.

10. In power transmissions, the combination of power and load shafts coupled by a step ratio transmission assembly having an intermediate shaft and a hollow shaft, said latter shafts being adapted to be driven as transmission input members and having a compound output member drivable at one low speed ratio and at a higher intermediate speed ratio by selectively operable gearing coupled individually to said intermediate and said hollow shafts and drivable at a reverse speed ratio, coupling means for connecting said intermediate and hollow shafts individually or together to said power shaft, said assembly providing for direct drive between said power and said load shafts when said intermediate and hollow shafts are both coupled, actuable ratio-determining means operative upon said coupling means and said gearing for selective operation thereof to provide low forward and intermediate forward speed ratios through selective coupling by said coupling means of said intermediate and said hollow shafts, while retaining a selected drive relationship of said gearing during the drive in forward reduction established by actuation of said clutches, a reverse drive-establishing train of said gearing operative during an interval when said intermediate shaft is coupled to said powershaft to drive said load shaft reversely and adapted to be actuated by said ratio determining means and control means for said ratio-determining means effective to alternate the coupling of said intermediate and said hollow shafts for said forward reduction drive at low and intermediate ratios effective to cause coupling of said intermediate shaft and drive by said reverse train, and further effective to couple both of said hollow and said intermediate shafts to said power shaft while releasing the said selectively operable gearing connection for establishing direct drive between said power and said load shafts.

11. In power transmissions, a driving shaft and a driven shaft coupled by a planetary gear assembly consisting of a primary and a secondary unit including reaction members for each of said units, a permanent coupling between the driven shaft, the carrier for the primary unit and the annulus of the secondary unit; input sun gears and a sun gear shaft for both said units, a first clutch member connected to said sun gear shaft, a second clutch member connected to the carrier of the said secondary unit, separately operated low and reverse brakes for said reaction members operable during selected intervals of engagement and release, means to couple said second clutch to said driving shaft while engaging during one of said intervals, said first named brake with the reaction member of said primary unit annulus gear for obtaining a differential speed of rotation of said output carrier and said driven shaft, said differential rotation being enforced by the coupling of said sun gears and said primary group carrier with said secondary group annulus, and means effective to couple said first clutch of said sun gear shaft with said driving shaft during the coupling of the said second named clutch while releasing said first named brake of said primary group annulus gear, for establishing a compound couple for direct drive between the said driving and driven shafts in which the two said clutches transmit differential torques.

12. In power transmitting devices the combination of an engine shaft and a load shaft, and step ratio gearing arranged to connect said shafts, a first clutch for coupling said engine shaft to said load shaft at one forward speed ratio, a second clutch for coupling said shafts at another forward speed ratio and an arrangement of said gearing whereby when both said clutches are coupled, the said shafts are coupled at one-to-one ratio; fluid pressure means effective to load said clutches variably at predetermined pressures corresponding to required clutch torque capacities, control means for said fluid pressure means including ratio selecting mechanism and including speed responsive valves adapted to increase the clutch loading force provided by said means, one of said speed responsive valves for each clutch, ratio selecting valving including in said mechanism for directing fluid pressure to said speed responsive valves and to said clutch-loading fluid pressure means in a pre-ordained pattern of control to provide individual or common actuation of said clutches and a fluid pressure passage connecting the fluid pressure means for the first one of said clutches with the speed responsive valve for the other of said clutch loading means effective when said selecting valving is positioned for directing pressure to load both said clutches, to hold said speed responsive valve in position to deliver pressure to the other of said clutch loading means.

13. In power transmission drive mechanism, power and load shafts coupled by variable step ratio gearing trains, a pair of friction transmission clutches arranged with respect to separate trains of said gearing to provide separate drive ratios when individually energized and one-to-one ratio when both are energized, control means operable to establish ratio drive by one or both of said clutches in a predetermined ratio transition pattern, said control means being adapted to cause energization of one clutch, the other clutch, and both clutches in a sequence of forward drives thru said gearing wherein the transitions between the drives by said clutches occur without interruption of torque between said shafts, centrifugal means effective to regulate the torque capacities of said clutches during said drives and said transitions, and clutch unloading means operable to cause clutching of said clutches and operable by centrifugal force and effective upon both said clutches to release them when said centrifugal means becomes inactive, resulting in a complete release of the drive of all of said trains.

14. In power transmissions, an engine shaft, a load shaft, a variable ratio step gear unit coupling said shafts including separate drive trains potentially connecting said shafts made operable by two friction input clutches, a fluid pressure supply for said unit, control valving connected to said supply operative to determine the actuation of said clutches and thereby the selection of drive by said trains, a flywheel member connected to said engine shaft formed for enshrouding clutch loading pistons for each of said clutches and having radial passages for delivering pressure to said pistons fed from a gland connected to said valving and to said supply, and clutch unloading means mounted in said member and effective upon said pistons to release the torque of said clutches, said unloading means including mass elements responding to centrifugal force derived from rotation of said member.

15. In power drive controls, an engine shaft, a load shaft, a step ratio transmission coupling said shafts and including a plurality of drive trains, a flywheel member driven by said engine shaft, friction clutches adapted to couple said engine to said transmission trains for selected drive at selected step ratios, fluid pressure loading means for said clutches, a fluid pressure supply and individual feed lines for said clutches, clutch pressure regulating valving for said clutches including a valve for each clutch mounted radially in said member, and connected to said supply and to said feed lines for providing an increasing clutch loading pressure with outward radial movement, peripherally mounted weights attached to each of said valves, each valve having a pressure space in which differential pressure exerts force tending to move the valve inwardly when the outward force of said weights is below a predetermined value, and means for adjusting the rate of pressure flow between said loading means and said valving, the recited fluid pressure supply, feed lines, loading means, and pressure regulating valving constituting a ratio drive selection and operation system in which the said last named means is effective for different drive ratios.

16. In power driving mechanism, a step ratio transmission constantly coupled to a load shaft, said transmission having a plurality of different ratio drive trains, an engine operable over a given useful range of speed, a flywheel member driven by said engine, friction clutches each connected individually to one of said trains and commonly actuable for coupling said member to said transmission at different driving ratios, cylinder spaces in said member for loading pistons acting upon said clutches, radial fluid feed passages in said member connected to the said cylinder spaces for loading said pistons, weighted levers acting as centrifugal masses arranged to apply a variable fulcrum action upon said pistons for releasing the torque of said clutches for counteracting the effect of centrifugal force upon the fluid of said passages and spring means effective to add force to the centrifugal action of said levers.

17. In power transmissions, an engine-driven shaft, a load shaft, a variable step ratio transmission arranged to couple said shafts including plural input friction clutches individually or commonly engageable to provide low intermediate and direct drive respectively between said shafts; a selective actuation and control system for operating said clutches including controllable actuating means for said clutches and controllable ratio selection means effective to establish variable torque drive by each one of said clutches, and a first device adapted to variably control said actuating means in accordance with the load demand of said engine and commonly acting with a second actuating control device which responds to the speed of one of said shafts.

18. In power transmission mechanisms, driving and driven shafts, a plurality of torque-transmitting means adapted to connect said shafts at different drive ratios, a plurality of brakable torque reaction-supporting means adapted to provide fulcra for the torque transmission established by said first named means, plural clutches arranged to make said torque-transmitting means effective with plural reaction-locking brakes arranged to make said second-named means effective, actuation and control means for said clutches and brakes including a fluid pressure supply and directive valving system connected to individual actuators for each of said clutches and brakes, and including pressure regulating valving, which valving includes speed responsive means connected to vary the action of said actuation means upon said actuators in accordance with the torque requirement of said first and second-named means, and with the speed of one of said shafts.

19. A variable step ratio transmission unit having geared members and gear trains adapted to connect power and load shafts at different selected drive ratios through separate gear trains thereof, a pair of ratio-determining friction clutches adapted to connect two geared members of said unit individually and jointly to said power shaft for yielding two separate reduction drive ratios and direct drive between the shafts respectively, fluid servo actuator means for said clutches, torque reaction control means with reaction-sustaining elements individually actuable during selected intervals of individual actuation of said clutches, fluid servo actuator means for said elements, a fluid supply providing plural ranges of actuation pressure for both said actuator means, ratio selection control valving operative to connect said supply and said actuator means for establishing one pattern of actuation and commonly effective upon one of said clutches and one of said elements, to establish a predetermined drive ratio between said power and load shafts, or operative for establishing a different pattern of actuation in which said elements are non-actuated and both said clutches are actuated, and a device adapted to provide selective pressure ranges delivered by said supply and made operative by said valving, and effective such that the ratio selection action of said valving likewise selects predetermined ranges of operating pressure from said supply.

20. A fluid pressure actuated ratio control and selection system for a step ratio transmission having a fluid supply providing plural ranges of actuation pressure, forward drive ratio determining mechanism embodied in said transmission including a plurality of members each adapted to be individually actuated by fluid pressure delivered selectively and in overlapping relationship to said members from said supply without interruption of torque during successive forward drive changes of said mechanism, control valving including successively arranged delivery porting operative to select the ratio of said transmission by selective delivery of said fluid pressure to said members, and the arrangement of said porting of said valving with respect to said plural pressure range of supply being such that the action of ratio selection automatically selects the required actuation pressure range.

21. A fluid pressure actuated ratio control and selection system for a step ratio transmission including plural friction elements actuable to establish selected driving speed ratios and to provide a forward drive range of said ratios wherein actuation means for said elements are operable to provide said range without interruption of driving torque, said system having a fluid supply, means providing plural ranges of actuation pressure delivered by said supply, said means including pressure responsive valving, control valving connected to said means and said valving and operable to deliver pressure to said actuation means for said elements, and an arrangement of said valving operative to select simultaneously the elements to be actuated and the pressure ranges for their actuation.

22. In power transmission mechanism, driving and driven shafts, a variable step ratio gear transmission unit adapted to couple said shafts at selected speed ratios including plural friction clutches and reaction members with fluid pressure actuators actuable in a predetermined pattern for establishing plural reduction, direct, and reverse drives between said shafts, a fluid pressure supply and lubrication system for said unit operative to energize said actuators and to lubricate the friction faces of said clutches and said members, the system including pump means driven by both of said shafts equipped with combined output pressure delivery lines leading to control valving adapted to direct the pressure to said actuators, and centrifugally operable regulator valves for each clutch located in passages between the said valving and the said actuators and effective to graduate the building up of clutch loading pressure for each clutch actuator in accordance with the speed of one of said shafts.

23. In power transmission control systems, an input power shaft and an output load shaft, a variable step ratio transmission adapted to connect said shafts thru a plurality of drive trains and having plural input torque-supporting elements, arranged to connect said power shaft to said drive trains, a plurality of friction clutches adapted to connect the said drive trains for drive at different ratios including a friction clutch adapted to couple said input shaft with one of said transmission elements and thereby transmit drive to said driven shaft thru one of said trains, a servo piston and cylinder providing loading means for said clutch, a fluid pressure supply, a selective control valving connecting said supply with said piston and said cylinder, and a centrifugally moved valve rotating with one of said shafts effective to create a higher delivered pressure to said clutch servo cylinder with increase of speed, said valve having a differential pressure space the pressure of which is effective to cause said valve to move to oppose the stated centrifugal action to create a lower pressure in said cylinder at below a predetermined low rotating speed of said valve.

24. In controls for power drives, an engine shaft and a load shaft, a variable ratio transmission adapted to couple said shafts in a plurality of drive ratios, said transmission including a plurality of clutches each operative to provide drive at a different ratio from one another, said plurality of clutches including a ratio-determining clutch adapted to establish drive by said transmission in one of said drive ratios, fluid pressure actuation means for said clutch, a fluid supply, means including fluid pressure valves, ports and passages for providing plural pressure ranges for actuation of said clutch by said supply, control valving effective to select operation of said clutch, and porting for said control valving connected to said fluid-pressure valve means operative to deliver pressure of one range to said first-named means for one ratio setting of said control valving, and operative in another ratio setting to deliver pressure of another range to said actuation means.

25. In the combination set forth in claim 24, the sub-combination of a centrifugally-operated valve located in the connection between said actuation means and said control valving, effective to modify the pressure delivered by said valving from said plural pressure range porting.

26. In power controls for power transmitting drives, a system of fluid pressure actuation for plural input clutches in a multiple step ratio transmission assembly, said assembly having a plurality of drive trains and having a plurality of clutches operative to connect the drive of said assembly separately for said trains, the said system including a fluid pressure supply, clutch actuators, operating means for said actuators operable by fluid pressure from said supply to vary the loading and thereby the torque capacities of said drive-train clutches, and speed-responsive means operable by the effect of rise in speed to increase the loading of said clutches, speed responsive unloading means for said clutches, pressure varying valving in said system, speed responsive valving for said speed-responsive means providing the said effect of rise in speed including a valve for each of said clutches, a drive ratio selection control operative to direct pressure from said supply and said first-named pressure varying means to said speed responsive valving and said clutch actuator operating means, and clutch selecting valves operated by said control and arranged to supply predetermined ranges of fluid pressures corresponding to the relative torques to be carried by the clutches.

27. In controls for power transmission mechanisms, an engine, an engine intake manifold, a plurality of input clutches adapted to couple the engine to separate ratio trains of a step ratio transmission which is constantly coupled to a load shaft, and is driven by said plural drive trains, fluid pressure operated actuators for said clutches individually operable for determining the effective drive ratio of said transmission, fluid pressure control means for said actuators including a valve effective to increase the degree of fluid pressure operative to load one of said clutches with decrease of the force of vacuum in said manifold, a second valve effective to increase the degree of pressure operative to load said one of said clutches with rise in speed whereby the net pressure acting to load said one of said clutches is simultaneously proportional to degree-of-manifold-vacuum and to speed, and ratio selecting valving included in said control means operative to direct fluid pressure to said vacuum-responsive and speed-responsive valves.

28. In power transmission mechanism, a driving shaft, a driven shaft, a gear transmission having a plurality of ratio drive trains, a plurality of friction clutches adapted to couple said shafts thru said plurality of drive trains for establishing drive at different effective gear ratios, each clutch consisting of a driving member rotating with said driving shaft and a driven member rotating with one of said trains, engaging means for one of said clutches in which one of the members is movable under applied fluid pressure to engage the other, the said pressure acting to load and to hold the members so as to transmit torque over a predetermined range of torque capacities commensurate with the degree of said loading pressure, a clutch housing rotating with the driving shaft and having an attached member enclosing the latter and formed to accommodate fluid pressure responsive actuation means for said movable clutch member, radial passages in said housing connected to deliver clutch loading pressure to said actuation means, a centrifugal valve in said passages operative to regulate the loading pressure in accordance with the rotational speed of said housing, and clutch unloading mechanism embodying speed-responsive elements effective to counteract the effect of centrifugal force on the body of fluid in said radial passages for preventing drag of said clutch members under clutch release control conditions.

29. In the combination set forth in claim 28, the subcombination of two clutches associated with said plurality of ratio-determining drive trains, said unloading mechanism including springs arranged to apply a clutch-unloading force to said speed-responsive elements, and said elements being operative to coact with the movable members of said two clutches such that in the absence of fluid pressure in said actuation means, the unloading mechanism is effective to unload both said clutches so as to release the drive of said transmission.

30. In power transmissions having a plurailty of fluid pressure loaded friction clutches for transmission of power thru variable step ratio gearing adapted to couple engine-driven and load shafts thru a plurality of drive trains, an arrangement of said plurality of friction clutches in which one of said friction clutches is operative for coupling one of said trains, fluid pressure actuating means for said operative clutch connected to a fluid pressure supply, pressure regulating valving in the connection between said supply and said means, said valving being responsive to both engine torque and speed so as to determine the loading pressure and thereby the torque capacity of the said one clutch of said plurality of clutches, and selective valving in said connection controlling the delivery of pressure of said supply to said actuating means likewise effective to determine a clutch loading pressure value predetermined for the particular drive train torque to be sustained by said one clutch.

31. In power transmissions, a drive arrangement embodying a plurality of fluid pressure loaded friction clutches adapted to connect power and load shafts thru plural drive trains of said transmission, an engine, a friction clutch of said plurality consisting of driving and driven members arranged to establish the drive of one of said trains, fluid pressure actuating mechanism for loading said train connecting clutch so as to provide a range of different torque capacities, a fluid pressure supply for said mechanism, control valving and connections for directing the supply pressure to said mechanism and for relieving same therefrom, a variable pressure relief valve arranged in said connection for variably regulating the degree of said clutch loading pressure to provide predetermined clutch torque capacities of all of said clutches, said relief valve exhausting the said supply pressure for producing regulation of said loading pressure, and a dynamometric device operative to respond to torque variations of said engine and connected to influence the pressure-regulating action of said relief valve, such that the loading pressure and torque capacity of said clutch are commensurate with the operating torque of said engine, a valve mounted to rotate with one of said shafts and operative to respond to centrifugal force rising with the speed of that one of said shafts, said last mentioned valve being located in the connections of said control valving to said clutch actuating mechanism, and operative to regulate the actuating pressure applied to said clutch in accordance with said shaft speed changes.

32. In fluid pressure controls for power transmissions, an engine shaft, a driven shaft, a gear drive assembly for coupling said engine and driven shafts in a plurality of drive trains providing separate transmission ratios between said shafts, a plurality of drive-establishing elements of said assembly operable in a predetermined pattern for selective actuation of said elements, a plurality of fluid pressure actuator mechanisms including one fluid pressure actuator mechanism operative to establish the drive of one of said trains, a selective friction member arranged to actuate one of said elements selectively and adapted to be variably loaded by said mechanism, a fluid pressure connection leading to said mechanism, a fluid pressure supply, control valving arranged to deliver the supply pressure to said plurality of actuator mechanisms and to said connection, and a pressure-responsive valve operative to determine one of two pressure levels of the pressure of said connection so as to provide selective loading actuation of said member by said mechanism and a control for said valving effective to direct the supply pressure to said valve for controlling which of said pressure levels is available for said loading actuation.

OLIVER K. KELLEY.

REFERENCES CITED

The following references are of record in the file of this patent:

UNITED STATES PATENTS

| Number | Name | Date |
|---|---|---|
| 687,172 | Upton | Nov. 19, 1901 |
| 731,470 | Pontois | June 23, 1903 |
| 1,203,290 | Weiland | Oct. 31, 1916 |
| 1,316,740 | Reeve | Sept. 23, 1919 |
| 1,353,894 | Criqui et al. | Sept. 28, 1920 |
| 1,609,782 | Small | Dec. 7, 1926 |
| 1,619,701 | Chorlton | Mar. 1, 1927 |
| 1,866,891 | Jackson | July 12, 1932 |
| 1,938,914 | Kress | Dec. 12, 1933 |
| 1,991,124 | Sharpe | Feb. 12, 1935 |
| 2,143,321 | Kegresse | Jan. 10, 1939 |
| 2,150,950 | Thoma | Mar. 21, 1939 |
| 2,193,305 | Thompson | Mar. 12, 1940 |
| 2,205,470 | Dunn | June 25, 1940 |
| 2,223,716 | Bojeson | Dec. 3, 1940 |
| 2,229,345 | Schotz | Jan. 21, 1941 |
| 2,291,241 | Lawrence | July 28, 1942 |
| 2,332,593 | Nutt et al. | Oct. 26, 1943 |
| 2,416,154 | Chilton | Feb. 18, 1947 |
| 2,528,585 | Farkas et al. | Nov. 7, 1950 |

OTHER REFERENCES

Publications: Der Motor Wagon (German), pages 142 to 145 inclusive, March 10, 1928; Engineering, pages 449, 445, April 13, 1928.